United States Patent
Ramanan et al.

(10) Patent No.: US 10,495,502 B2
(45) Date of Patent: *Dec. 3, 2019

(54) ULTRASONIC FLOW METER AUTO-TUNING FOR RECIPROCAL OPERATION OF THE METER

(71) Applicant: TEXAS INSTRUMENTS INCORPORATED, Dallas, TX (US)

(72) Inventors: R Venkata Ramanan, Bangalore (IN); Anand Dabak, Plano, TX (US); Amardeep Sathyanarayana, Austin, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/987,129

(22) Filed: May 23, 2018

(65) Prior Publication Data

US 2018/0266860 A1    Sep. 20, 2018

Related U.S. Application Data

(63) Continuation of application No. 14/862,832, filed on Sep. 23, 2015, now Pat. No. 10,006,791.

(51) Int. Cl.
*G01F 25/00* (2006.01)
*G01F 1/66* (2006.01)

(52) U.S. Cl.
CPC .......... *G01F 1/667* (2013.01); *G01F 25/0007* (2013.01)

(58) Field of Classification Search
None
See application file for complete search history.

(56) References Cited

U.S. PATENT DOCUMENTS

| | | | |
|---|---|---|---|
| 4,221,128 A | 9/1980 | Lawson et al. | |
| 4,425,715 A | 1/1984 | Hansen | |
| 5,115,672 A | 5/1992 | McShane | |
| 5,337,611 A | 8/1994 | Fleming | |

(Continued)

FOREIGN PATENT DOCUMENTS

| | | |
|---|---|---|
| EP | 0670477 A2 | 10/1990 |
| EP | 0498141 A1 | 8/1992 |

(Continued)

OTHER PUBLICATIONS

European Search Report dated Sep. 20, 2018.

*Primary Examiner* — Michael Lebentritt
(74) *Attorney, Agent, or Firm* — Kenneth Liu; Charles a. Brill; Frank D. Cimino

(57) ABSTRACT

A method, system and apparatus is disclosed for auto-tuning a circuit associated with an upstream transducer (UPT) and a circuit associated with a downstream transducer (DNT) for reciprocal operation in an ultrasonic flowmeter. The method includes exchanging signals between the upstream transducer and the downstream transducer; comparing at least one of respective maximum amplitudes of an upstream signal and a downstream signal and respective center frequencies of a Fast Fourier Transform (FFT) of the upstream signal and the downstream signal; and responsive to determining that at least one of the respective maximum amplitudes and the respective center frequencies do not match, correcting the mismatch.

19 Claims, 12 Drawing Sheets

(56) References Cited

U.S. PATENT DOCUMENTS

| | | |
|---|---|---|
| 5,512,843 A | 4/1996 | Haynes |
| 5,777,892 A | 7/1998 | Nabity |
| 5,964,706 A | 10/1999 | Mo |
| 6,005,827 A | 12/1999 | Hossack |
| 6,104,670 A | 8/2000 | Hossack |
| 6,584,847 B1 | 7/2003 | Hirose |
| 6,584,861 B1 | 7/2003 | Jaspersen |
| 6,748,812 B1 | 6/2004 | Takemura |
| 7,088,765 B1 | 8/2006 | Green |
| 7,289,914 B2 | 10/2007 | Hishida |
| 7,564,981 B2 | 7/2009 | Croft, III |
| 7,987,732 B2 | 8/2011 | Konzelmann |
| 9,759,646 B2 | 9/2017 | Oikonomou |
| 10,006,791 B2 * | 6/2018 | Ramanan ............ G01F 25/0007 |
| 2003/0200817 A1 | 10/2003 | Suginouchi et al. |
| 2005/0011278 A1 | 1/2005 | Brown |
| 2005/0288871 A1 | 12/2005 | Urdaneta et al. |
| 2005/0288873 A1 | 12/2005 | Urdaneta |
| 2007/0174013 A1 | 7/2007 | Liescheski |
| 2009/0266165 A1 | 10/2009 | Greenwood |
| 2014/0318268 A1 | 10/2014 | Sorensen |
| 2016/0208952 A1 | 7/2016 | Howitt |
| 2016/0334255 A1 | 11/2016 | Gestner |
| 2017/0168153 A1 | 6/2017 | Kozuki |

FOREIGN PATENT DOCUMENTS

| | | |
|---|---|---|
| EP | 0498141 B1 | 8/1992 |
| EP | 0670477 A2 | 6/1995 |
| GB | 2079939 A | 1/1982 |
| HU | 0500553 A2 | 2/2007 |
| JP | 2007055574 A | 6/2007 |
| JP | 2007155574 A | 6/2007 |
| WO | 9417371 | 8/1994 |
| WO | 9956135 | 4/1999 |

* cited by examiner

FIG. 10A
FIG. 10B

| R | C | AVERAGE $|zc1-zc2|$ | AVERAGE $|per1-per2|$ | MAXIMUM $(Y1-Y2)$ |
|---|---|---|---|---|
| 199 | 88 | 3.98E-10 | 4.11E-11 | 4.59E-03 |
| 199 | 90 | 3.31E-10 | 3.32E-11 | 3.91E-03 |
| 199 | 92 | 2.63E-10 | 2.70E-11 | 3.24E-03 |
| 199 | 94 | 1.96E-10 | 2.15E-11 | 2.61E-03 |
| 199 | 96 | 1.28E-10 | 1.79E-11 | 2.04E-03 |
| 199 | 98 | 6.13E-11 | 1.94E-11 | 1.61E-03 |
| 199 | 100 | 8.70E-12 | 2.86E-11 | 1.43E-03 |
| 199 | 102 | 7.27E-11 | 3.91E-11 | 1.60E-03 |
| 199 | 104 | 1.40E-10 | 4.96E-11 | 2.03E-03 |
| 199 | 106 | 2.06E-10 | 6.01E-11 | 2.59E-03 |
| 199 | 108 | 2.73E-10 | 7.06E-11 | 3.22E-03 |
| 199 | 110 | 3.40E-10 | 8.15E-11 | 3.87E-03 |
| 199 | 112 | 4.06E-10 | 9.19E-11 | 4.55E-03 |
| 199 | 114 | 4.72E-10 | 1.02E-10 | 5.22E-03 |
| 199 | 116 | 5.38E-10 | 1.13E-10 | 5.92E-03 |
| 199 | 118 | 6.04E-10 | 1.23E-10 | 6.62E-03 |
| 199 | 120 | 6.70E-10 | 1.33E-10 | 7.31E-03 |
| 200 | 80 | 6.78E-10 | 1.09E-10 | 7.32E-03 |
| 200 | 82 | 6.10E-10 | 9.79E-11 | 6.59E-03 |
| 200 | 84 | 5.41E-10 | 8.36E-11 | 5.85E-03 |
| 200 | 86 | 4.73E-10 | 7.31E-11 | 5.11E-03 |
| 200 | 88 | 4.05E-10 | 6.26E-11 | 4.38E-03 |
| 200 | 90 | 3.38E-10 | 5.21E-11 | 3.65E-03 |
| 200 | 92 | 2.70E-10 | 4.17E-11 | 2.91E-03 |
| 200 | 94 | 2.02E-10 | 3.17E-11 | 2.18E-03 |
| 200 | 96 | 1.35E-10 | 2.18E-11 | 1.45E-03 |
| 200 | 98 | 6.73E-11 | 1.09E-11 | 7.27E-04 |
| 200 | 100 | 4.29E-22 | 9.53E-22 | 1.87E-14 |
| 200 | 102 | 6.72E-11 | 1.08E-11 | 7.25E-04 |
| 200 | 104 | 1.34E-10 | 2.16E-11 | 1.45E-03 |
| 200 | 106 | 2.01E-10 | 3.24E-11 | 2.17E-03 |
| 200 | 108 | 2.68E-10 | 4.31E-11 | 2.89E-03 |
| 200 | 110 | 3.35E-10 | 5.37E-11 | 3.61E-03 |
| 200 | 112 | 4.02E-10 | 6.47E-11 | 4.33E-03 |
| 200 | 114 | 4.68E-10 | 7.53E-11 | 5.05E-03 |
| 200 | 116 | 5.34E-10 | 8.59E-11 | 5.77E-03 |
| 200 | 118 | 6.00E-10 | 9.64E-11 | 6.48E-03 |
| 200 | 120 | 6.66E-10 | 1.07E-10 | 7.20E-03 |
| 201 | 80 | 6.86E-10 | 1.39E-10 | 7.50E-03 |
| 201 | 82 | 6.17E-10 | 1.23E-10 | 6.77E-03 |
| 201 | 84 | 5.49E-10 | 1.12E-10 | 6.04E-03 |
| 201 | 86 | 4.80E-10 | 1.02E-10 | 5.34E-03 |
| 201 | 88 | 4.12E-10 | 9.09E-11 | 4.63E-03 |
| 201 | 90 | 3.44E-10 | 8.02E-11 | 3.94E-03 |
| 201 | 92 | 2.76E-10 | 6.96E-11 | 3.26E-03 |
| 201 | 94 | 2.08E-10 | 5.94E-11 | 2.62E-03 |
| 201 | 96 | 1.40E-10 | 4.89E-11 | 2.05E-03 |
| 201 | 98 | 7.28E-11 | 3.89E-11 | 1.61E-03 |
| 201 | 100 | 8.63E-12 | 2.81E-11 | 1.43E-03 |
| 201 | 102 | 6.21E-11 | 1.86E-11 | 1.61E-03 |
| 201 | 104 | 1.30E-10 | 1.70E-11 | 2.04E-03 |
| 201 | 106 | 1.97E-10 | 2.07E-11 | 2.61E-03 |
| 201 | 108 | 2.64E-10 | 2.83E-11 | 3.24E-03 |
| 201 | 110 | 3.31E-10 | 3.75E-11 | 3.90E-03 |

FIG. 11A

ULTRASONIC FLOW METER AUTO-TUNING FOR RECIPROCAL OPERATION OF THE METER

This application is a continuation of U.S. patent application Ser. No. 14/862,832 filed on Sep. 23, 2015, now U.S. Pat. No. 10,006,791, which is hereby incorporated by reference.

FIELD OF THE DISCLOSURE

Disclosed embodiments relate generally to the field of ultrasonic flow meters. More particularly, and not by way of any limitation, the present disclosure is directed to automatically detecting an imbalance between a pair of transducers and tuning the transducer circuits to restore balance.

BACKGROUND

Ultrasound technology is utilized for measuring fluid/gas velocity through a pipe of known dimensions, with ultrasound transducers placed within the pipes to determine the fluid/gas velocity and the fluid/gas volume flow, which is measured by multiplying fluid/gas velocity by the interior area of the pipe. Cumulative fluid volume may be measured by integrating fluid flow over time. To provide ultrasonic flow metering, two transducers are spaced apart within a pipe such that a first signal is sent in the upstream direction and a second signal is sent in the downstream direction. The time-of-flight (TOF) for both signals is measured, with the difference between the two measurements indicating the amount of flow within the pipe. Reciprocal operation in the two directions is critical as the measurements must attain a high degree of accuracy, e.g., in order to detect small leaks. A tuned flow meter can detect a difference in TOF in the range of picoseconds. Providing the necessary reciprocal operation means attaining zero differential TOF at zero flow despite mismatches in transducer pairs. Achieving this goal requires perfect matching of electrical impedances between the transmitting circuit and the receiving circuit. A common way to attain matching is by designing the ultrasonic hardware to be voltage transmit, i.e., with close to zero impedance on the driver side, and current receive, i.e., with close to zero impedance on the receiver side. Attaining zero impedance places stringent requirements on both the driver and the receiver circuits to behave as ideal circuits.

Several factors further complicate this process:
Although it is possible to correct a known offset of the signals during processing of the signals, any offset present between the two circuits will vary with the ambient and propagation medium temperature. Thus, in order to apply such corrections during processing, a temperature gauge is necessary for accurate flow measurements. The standards for flow meters require testing of the meter at zero flow over a range of temperatures.

The standards further require that flow meters be designed for a life span of 15-20 years. Over time, changes can occur, either within the pipe or to the transducer itself, e.g., sedimentation, corrosion, aging, etc., causing drifting of the acoustical impedance. When this occurs, it may be necessary to either retune or replace the flow meter, both of which require attention from a technician.

Upstream and downstream signals need to match point for point for perfect reciprocity, but when flow is occurring within the pipe, it is both tedious and difficult to perform this type of matching. Stopping the flow is often undesirable or impossible in the field.

SUMMARY

Applicants have observed that a lack of reciprocity in the upstream/downstream signals results in a frequency offset of the received wave. Digital signal processing techniques are disclosed to estimate how closely upstream and downstream waveforms match by estimating the difference in resonating frequency and/or amplitude between the upstream signal and the downstream signal. Rather than attempting a point-for-point match in the signals, the difference between the maximum amplitude of the upstream signal and the downstream signal can be used to detect a mismatch and estimate its magnitude. Similarly, the difference between the center frequency of a Fast Fourier Transform (FFT) of the upstream signal and the downstream signal can also be used to detect a mismatch and estimate its magnitude. When a mismatch is detected, one of two techniques can be utilized:

Adaptively tune the impedance of the transmitter or the receiver so that the same frequency is received in the two directions; or Provide compensation in digital processing of the signals with no tuning of the impedances.

A combination of these two techniques can also be used. Tuning of the impedance can be automatically performed by adjusting two components of the impedance—resistance and capacitance—using variable resistors and capacitors in the circuitry. Tuning the impedance can be done on the fly, with no need to stop the flow in order to measure the zero flow offset.

In one aspect, an embodiment of a method of auto-tuning a first circuit associated with an upstream transducer (UPT) and a second circuit associated with a downstream transducer (DNT) for reciprocal operation in an ultrasonic flowmeter is disclosed. The method comprises exchanging signals between the upstream transducer and the downstream transducer; comparing at least one of a group comprising respective maximum amplitudes of an upstream signal and a downstream signal and respective center frequencies of a Fast Fourier Transform (FFT) of the upstream signal and the downstream signal; and responsive to determining that at least one of the group comprising the respective maximum amplitudes and the respective center frequencies do not match, correcting the mismatch.

In one aspect, an embodiment of an integrated circuit chip for auto-tuning a first circuit associated with an upstream transducer (UPT) and a second circuit associated with a downstream transducer (DNT) for reciprocal operation in an ultrasonic flowmeter is disclosed. The integrated circuit chip comprises a microcontroller operably connected to the UPT and the DNT to provide control of the UPT and the DNT and further connected to receive a respective signal from each of the UPT and the DNT; and a memory operably connected to the microcontroller, the memory containing instructions that when performed by the microcontroller perform the following: exchanging signals between the upstream transducer and the downstream transducer; comparing at least one of a group comprising respective maximum amplitudes of an upstream signal and a downstream signal and respective center frequencies of a Fast Fourier Transform (FFT) of the upstream signal and the downstream signal; and responsive to determining that at least one of the group comprising the respective maximum amplitudes and the respective center frequencies do not match, correcting the mismatch.

Advantages of the disclosed device and method include at least the following:

- Digital techniques are employed, providing the capability of adaptive tuning in response to changes in transducer characteristics over time and temperature changes;
- Because digital techniques are employed, auto-tuning techniques can be used rather than requiring manual tuning, providing savings in calibration time and a reduction in the overall cost of the solution; and
- When changes are made to a system, such as adding additional circuitry in front of the existing electronics, the impedance of the transducer circuit can change. The disclosed digital techniques can adjust the transducer circuit impedance to correct for such changes.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIGS. 10A-B depict an upstream transducer and a downstream transducer according to an embodiment of the disclosure and illustrate the impedances that must be matched for transmissions in the upstream direction (FIG. 10A) and in the downstream direction (FIG. 10B);

FIG. 11A is a table illustrating calculations used to determine the settings for tuning the transducer circuits according to an embodiment of the disclosure;

DETAILED DESCRIPTION OF THE DRAWINGS

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1:
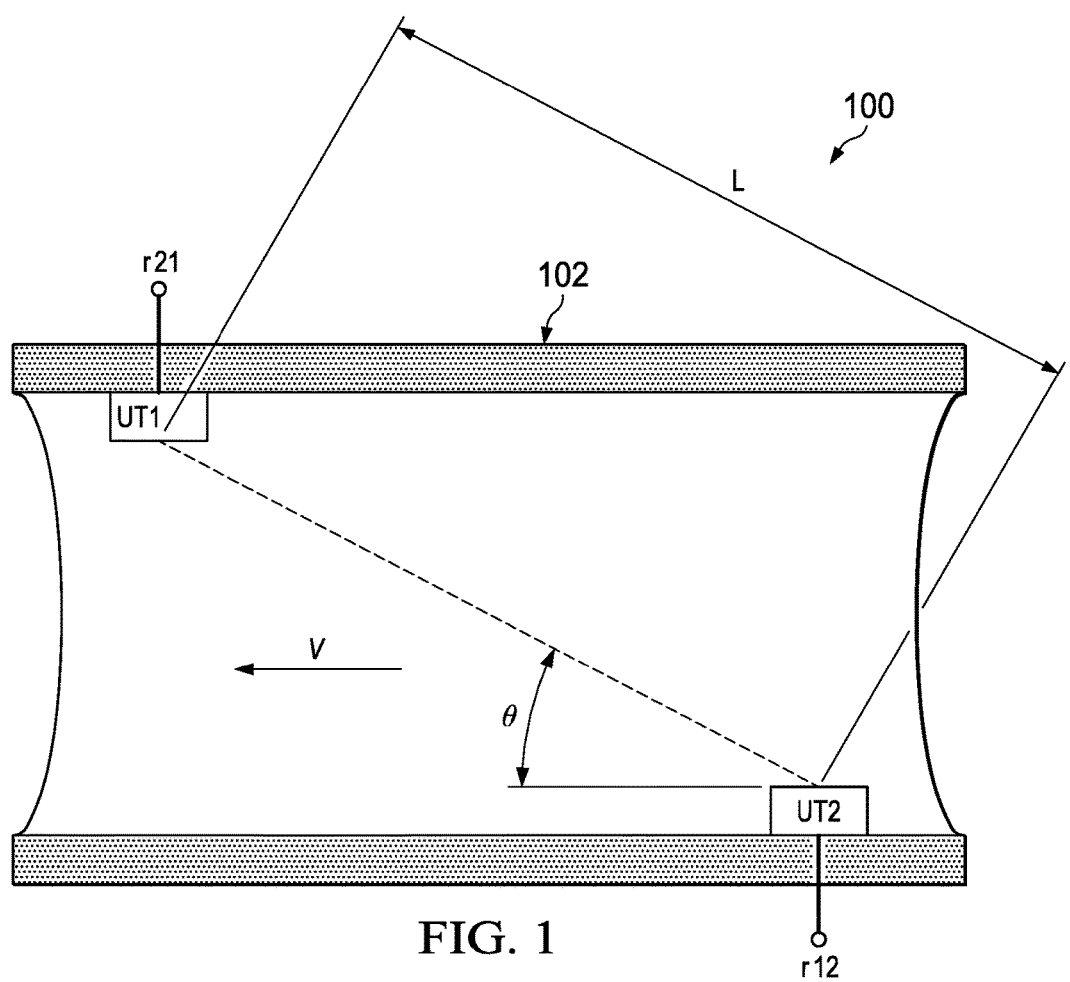
FIG. 1 depicts an example of a system for ultrasonically measuring the flow within a pipe that can be used to practice an embodiment of the disclosure.

Referring now to the drawings and more particularly to FIG. 1, an example is shown of a system 100 in which the disclosed embodiments can be practiced; system 100 includes two ultrasonic transducers, UT1 and UT2, placed within a pipe for fluid/gas velocity measurement. There are many alternative configurations for the arrangement of the transducers, and FIG. 1 is just an example for the purpose of illustrating the basic ideas for ultrasound measurement of fluid velocity. UT1 and UT2 are mounted inside pipe 102, and a gas or fluid is flowing through the pipe in the indicated direction with velocity V. The distance between ultrasonic transducers UT1 and UT2 is shown as L and the angle between the dashed line connecting the transducers and the wall of the pipe is ⊖. Propagation time t12, also called TOF, is the time for an ultrasonic signal to travel from UT1 to UT2 within the medium, whether gas or fluid. Likewise, propagation time t21 is the TOF for an ultrasonic signal to travel from UT2 to UT1 within the medium. If C is the velocity of the ultrasonic signal in the medium and V is the velocity of the medium in pipe 102, these propagation times are given by equations [1] and [2]:

$$t12 = \frac{L}{C + V\cos(\theta)} \quad [1]$$

$$t21 = \frac{L}{C - V\cos(\theta)} \quad [2]$$

The angle $\Theta$ and the distance L are known, and the objective is to measure the fluid velocity V. If the velocity C of the ultrasonic signal in the fluid is known, then only the difference between propagation times t12 and t21 is needed. However, the velocity C is a function of temperature, and a temperature sensor may or may not be included based on the target cost of the measurement system. Measuring two different propagation times (t12 and t21) cancels the variability of C. Combining equations [1] and [2] yields equation [3] for the fluid velocity V:

$$V = \frac{L}{2} * \frac{t21 - t12}{t21 * t12} \quad [3]$$

Therefore, the measurement of two ultrasonic propagation times (t12 and t21) is necessary to determine fluid velocity without knowing the velocity of an ultrasonic signal in the fluid.

Figure 2:
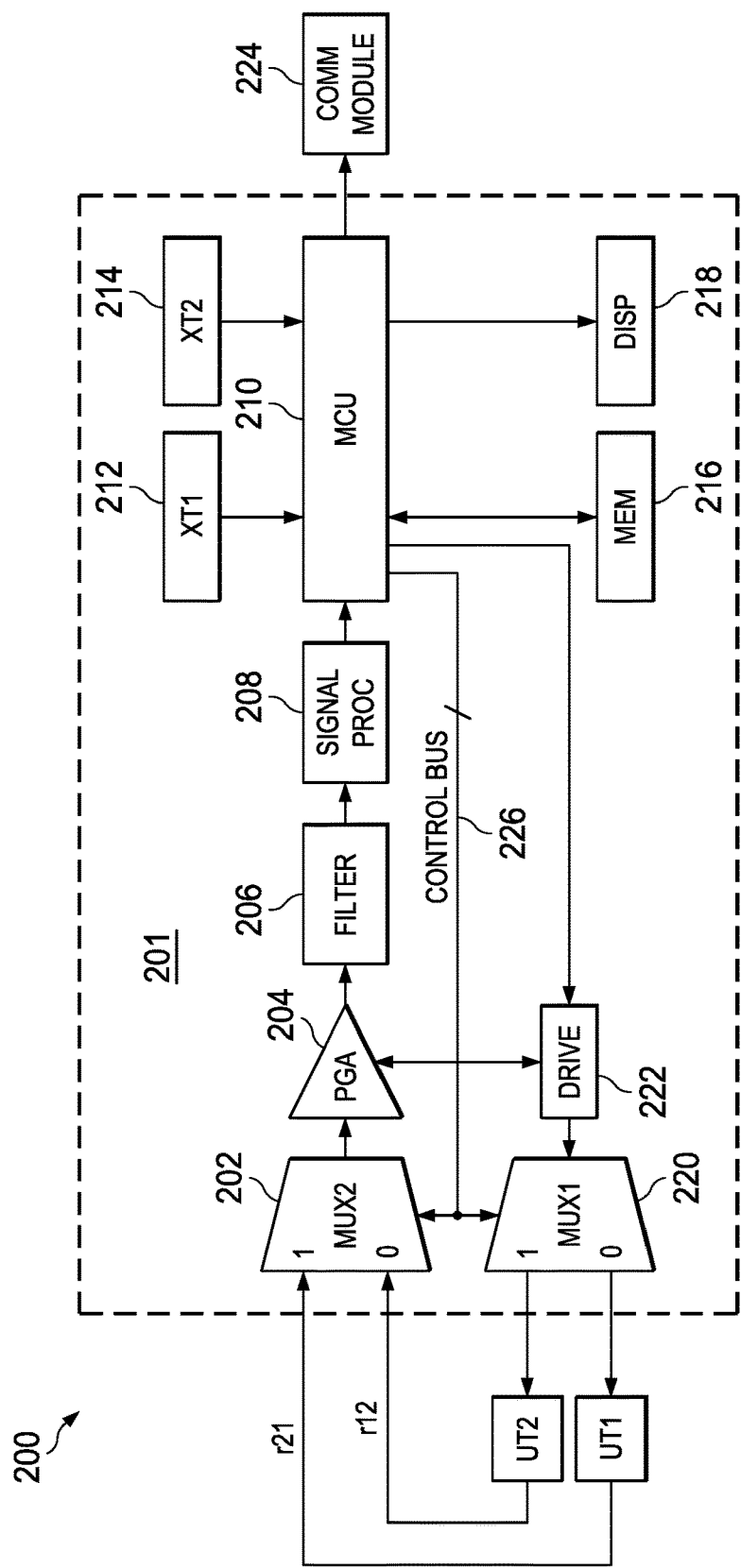
FIG. 2 is a circuit diagram of an ultrasonic measurement system that can be used to practice an embodiment of the disclosure.

Turning next to FIG. 2, a circuit diagram of an ultrasonic measurement system that can be used to practice an embodiment of the disclosure is shown. System 200 includes ultrasonic transducers UT1 and UT2, circuit 201 for controlling the transducers and interpreting the results, and communication module 224, which is operable to transmit flow information to a base station (not specifically shown). Circuit 201 can be embodied as a computer chip capable of interfacing with ultrasonic transducers UT1, UT2 and with communication module 224. Referring back to FIG. 1, signal r12 is the ultrasonic signal sent by transducer UT1 and received from transducer UT2. Likewise, signal r21 is the ultrasonic signal sent by transducer UT2 and received from transducer UT1.

Circuit 201 includes multiplex circuits 202 (MUX2) and 220 (MUX1) which are controlled by signals on control bus 226. MUX1 is coupled to receive an excitation signal from drive circuit 222 in response to micro control unit (MCU) 210. MCU 210 is coupled to memory circuit 216 and to display circuit 218. MCU 210 is also coupled to crystal oscillator circuit 212, which controls measurement times, and to crystal oscillator circuit 214, which controls excitation and sampling frequencies.

When a logical 0 from control bus 226 is applied to MUX1, the excitation signal from drive circuit 222 is applied to UT1. UT1 responsively transmits an ultrasonic signal to UT2. UT2 produces received signal r12, which is applied to MUX2. The logical 0 applied to MUX1 is also applied to MUX2 so that r12 is applied to programmable gain amplifier (PGA) 204. PGA 204 amplifies r12 and applies it to filter 206. The filtered signal is then applied to signal processing unit 208 to calculate alignment points for r21. Similarly, when a logical 1 from control bus 226 is applied to MUX1, the excitation signal from drive circuit 222 is applied to UT2. UT2 responsively transmits an ultrasonic signal to UT1. UT1 produces received signal r21, which is applied to MUX2. The logical 1 applied to MUX1 is also applied to MUX2 so that r21 is applied to programmable gain amplifier (PGA) 204. PGA 204 amplifies r21 and applies it to filter 206. The filtered signal is then applied to signal processing unit 208 to determine respective alignment points. The MCU calculates the differential time of flight and fluid flow from the alignment points. The result is applied to communication module 224 and transmitted to a base station. The MCU also applies the result to display 218.

Figure 3:
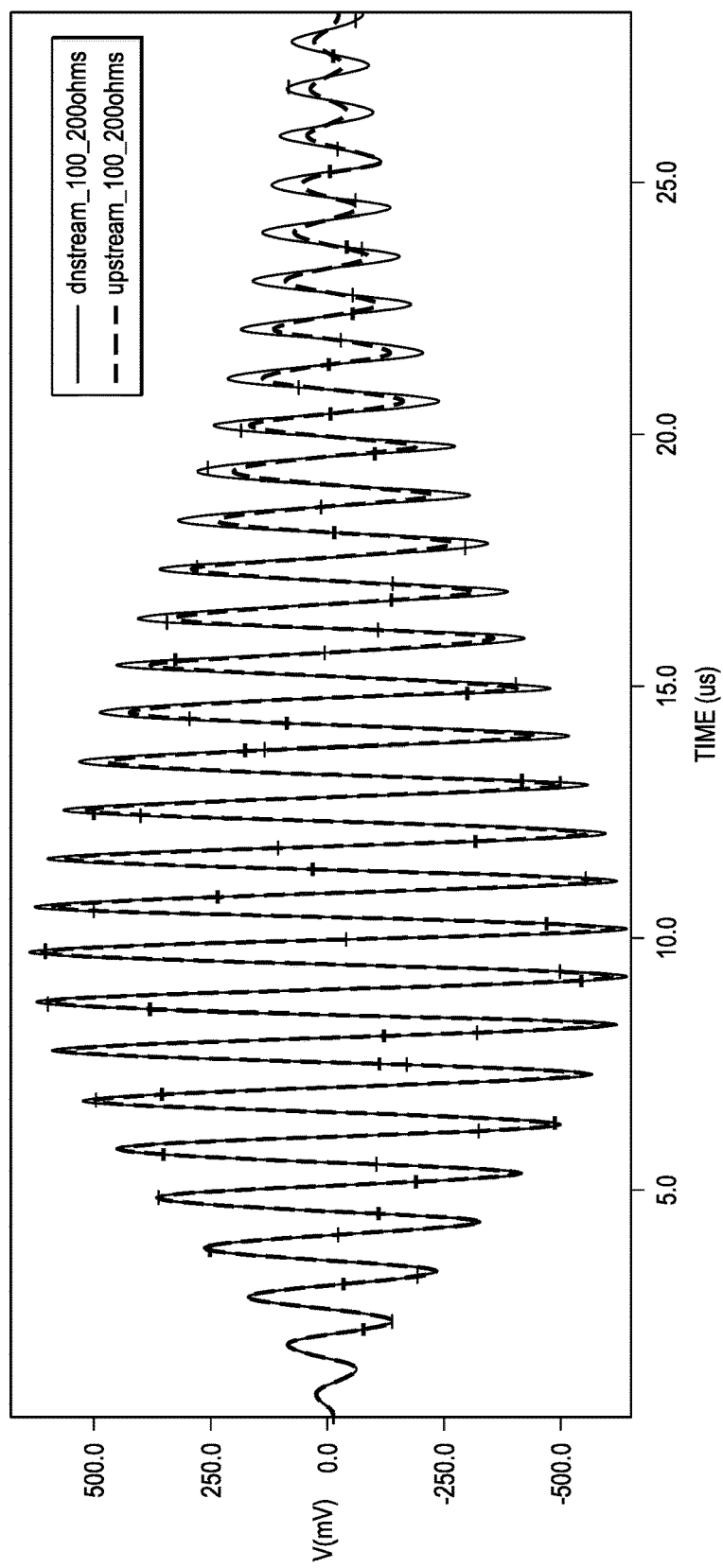
FIG. 3 is an example of received upstream and downstream ultrasonic signals adjusted for transmit time difference when the electrical impedances of the transducer circuits do not match.
Figure 4:
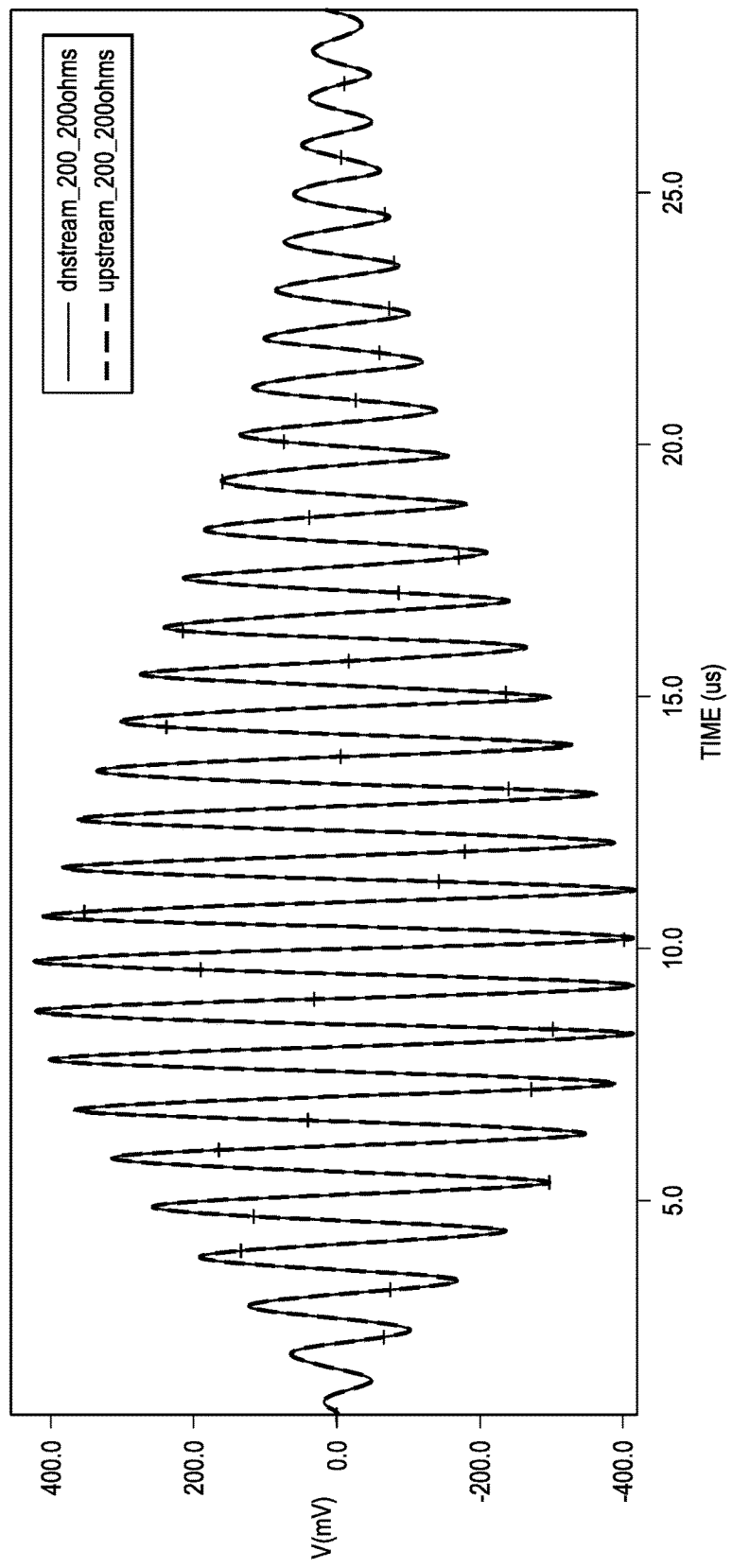
FIG. 4 is an example of received upstream and downstream ultrasonic signals adjusted for transmit time difference when the electrical impedances of the transducer circuits match.

FIG. 3 is a diagram of received upstream and downstream ultrasonic signals when the driver circuit for one transducer and the receiver circuit for the other transducer have different impedance values. The two signals are generated by respective excitation pulses and have been adjusted for transmit time difference. In this figure, the upstream signal is shown as a solid line, while the downstream signal is shown as a dotted line. While the differences can be subtle, both the amplitude of the signals and their frequencies are unmatched. FIG. 4 is a similar diagram of received upstream and downstream ultrasonic signals when the driver and receiver impedances are matched; the signals are also adjusted for transmit time difference. It can be seen that the signals are more closely matched in this latter figure, both in amplitude and in frequency, and appear to overlie each other. A method of detecting and using these properties will now be discussed with respect to the remaining figures.

Figure 5A:
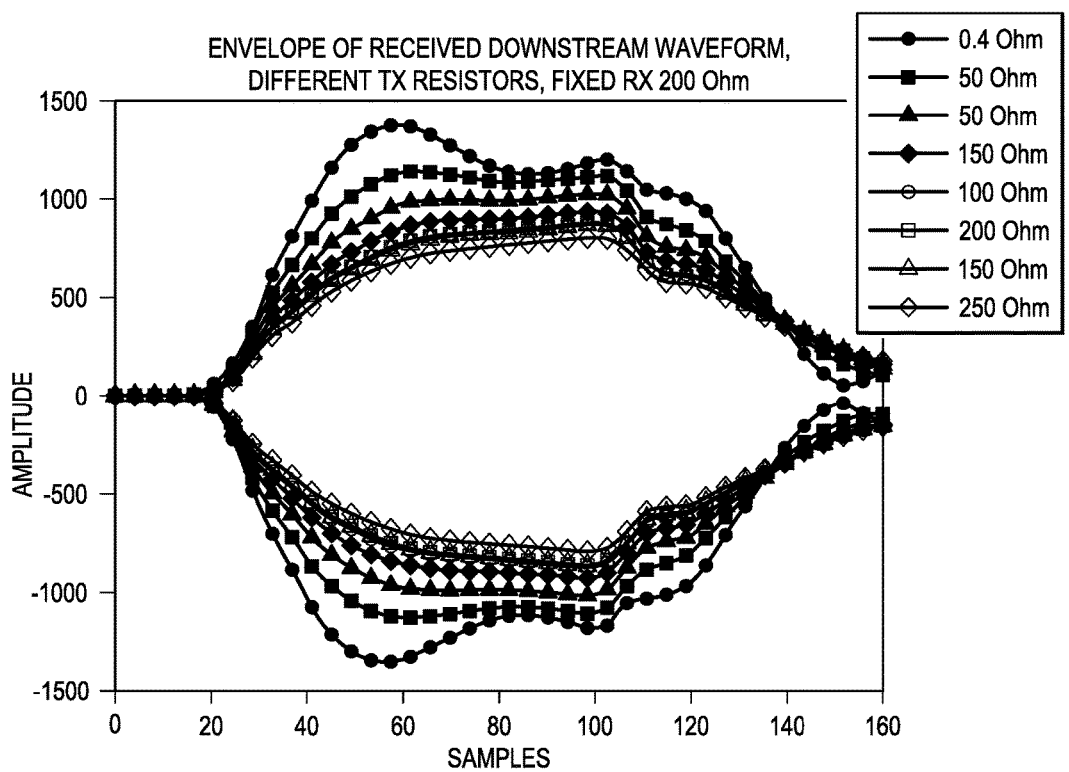
FIG. 5A depicts the envelope of the received waveforms for a number of signal transmissions made by holding the receiving transducer circuit at a fixed impedance value and varying the impedance of the transmitting transducer circuit.

FIG. 5A depicts the envelope of the received waveforms for a number of downstream signal transmissions between two transducers, with the x axis showing sampling points during the received signal and the y axis showing the measured amplitude of the signal. In this example, the impedance value in the receiving transducer circuit was held at 200 Ohms, while impedances having the values shown in the inset box were used in the transmitting transducer circuits, with the results measured in a flow laboratory. The results illustrate the differences in the waveform envelope when the impedance of the transmitting transducer circuit is mismatched with the impedance of the receiving transducer circuit. It can be seen in the outermost envelope that when the mismatch is the greatest, the envelope contains greater fluctuations, becoming smoother as the mismatch is less. As the impedance value on the transmitting transducer circuit comes closer to matching the impedance value on the receiving transducer circuit, the waveforms grow closer together and at the scale shown, some signals partially overlie each other. By comparing the maximum amplitude of the upstream signal with the maximum amplitude of the downstream signal, mismatched transducers can be detected and a correction routine can be implemented.

Figure 5B:
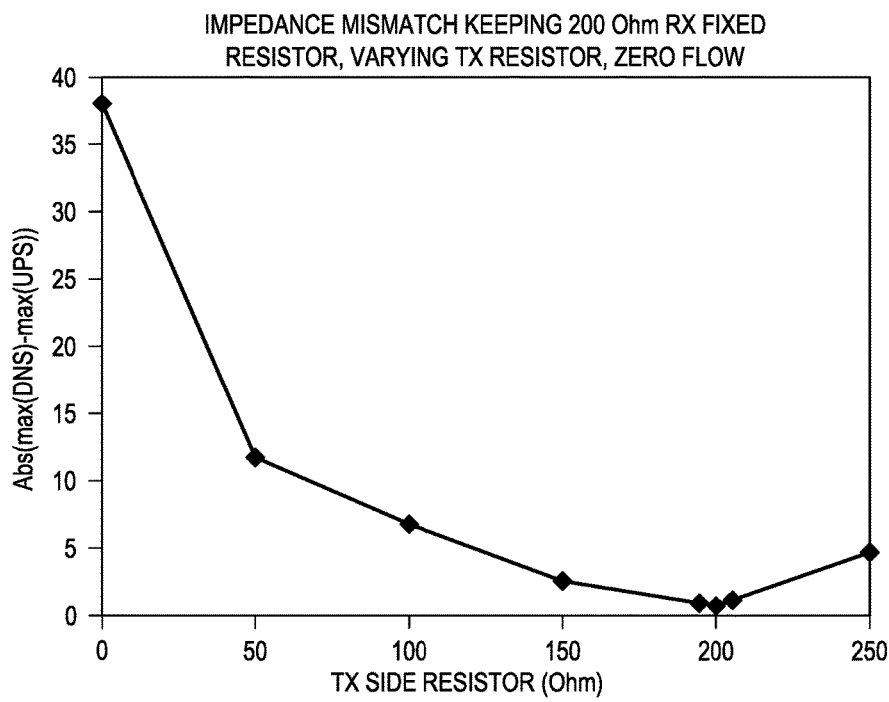
FIG. 5B is a graph depicting the difference in maximum amplitude between an upstream signal and a downstream signal as impedance is varied in one transducer circuit.

FIG. 5B contains some of the same information shown in FIG. 5A, although this latter figure concentrates on the maximum amplitude of the waveform, rather than the entire waveform. FIG. 5B is a graph depicting the difference in maximum amplitude between an upstream signal and a downstream signal as a resistor value in one transducer circuit is varied. As before, the receiving transducer circuit was held at 200 Ohms resistance. The x axis of the graph shows the resistance of the transmitting transducer circuit, while the y axis charts the absolute value of the difference between the maximum amplitude of the downstream signal and the maximum amplitude of the upstream signal, i.e., |max(DNS)−max(UPS)|. As can be seen, the difference in amplitude approaches zero as the value of the resistors approach a match.

Figure 6:
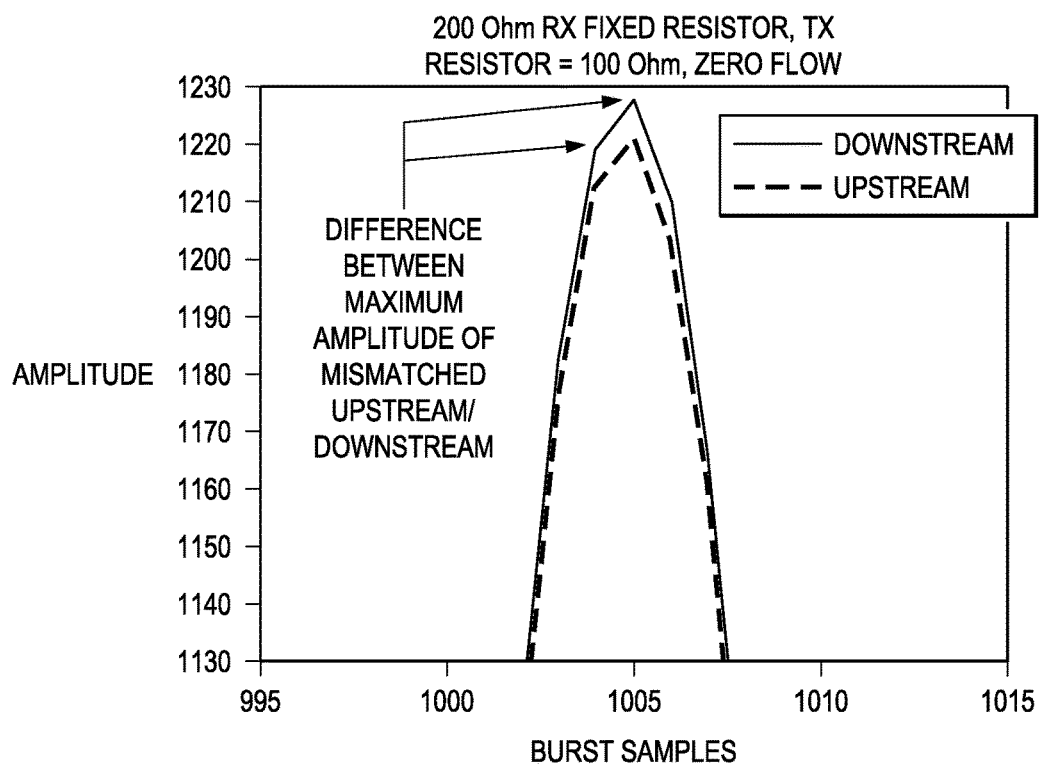
FIG. 6 depicts the difference between the maximum amplitude between an upstream signal and a downstream signal when the electrical impedances of the transducer circuits are mismatched according to an embodiment of the disclosure.
Figure 7:
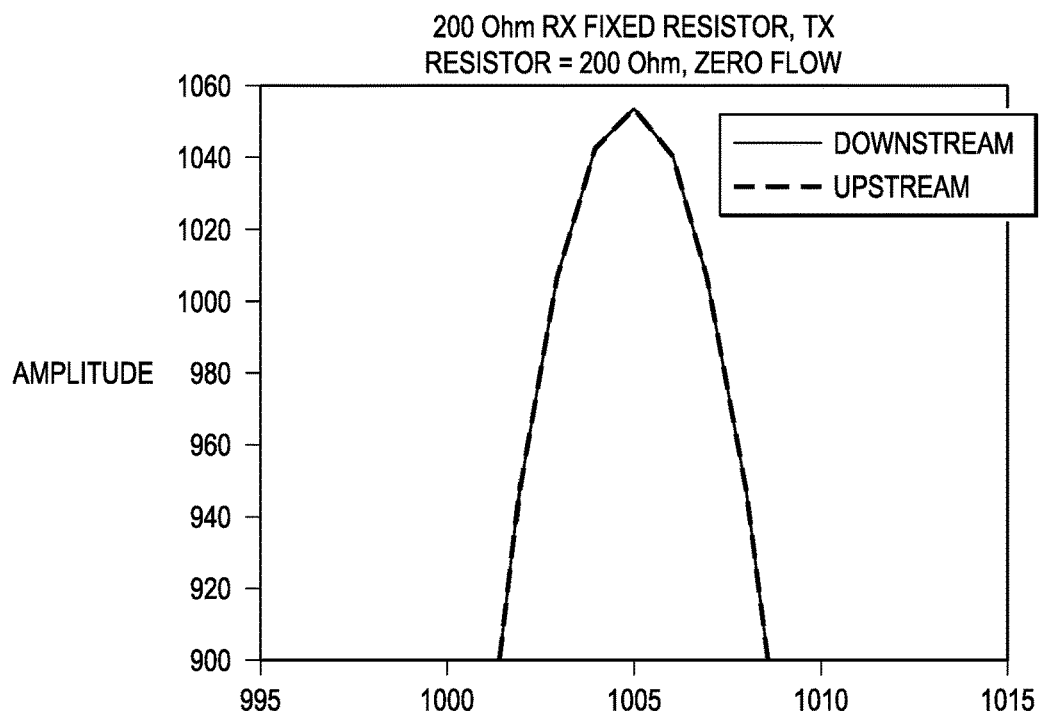
FIG. 7 depicts how the maximum amplitude between an upstream signal and a downstream signal coincide when the electrical impedances of the transducer circuits are matched according to an embodiment of the disclosure.

This same idea is further illustrated in FIGS. 6 and 7, which show a small portion of the waveforms of the upstream signal and the downstream signal near the maximum amplitude. In both figures, the receiving transducer circuit has a 200 ohm fixed resistor. In FIG. 6, the transmitting transducer circuit has a 100 ohm resistor, with the two transducer circuits thus mismatched by 100 ohms. The two signals were sent at zero flow. The mismatch can be clearly seen by the difference in maximum amplitude of the upstream and downstream signals. In FIG. 7, the transmitting transducer circuit has a 200 ohm resistor, giving it a match to the receiving transducer circuit. As this figure shows, when the two transducer circuits are matched, their maximum amplitudes also match in a point-for-point fashion.

Figure 8:
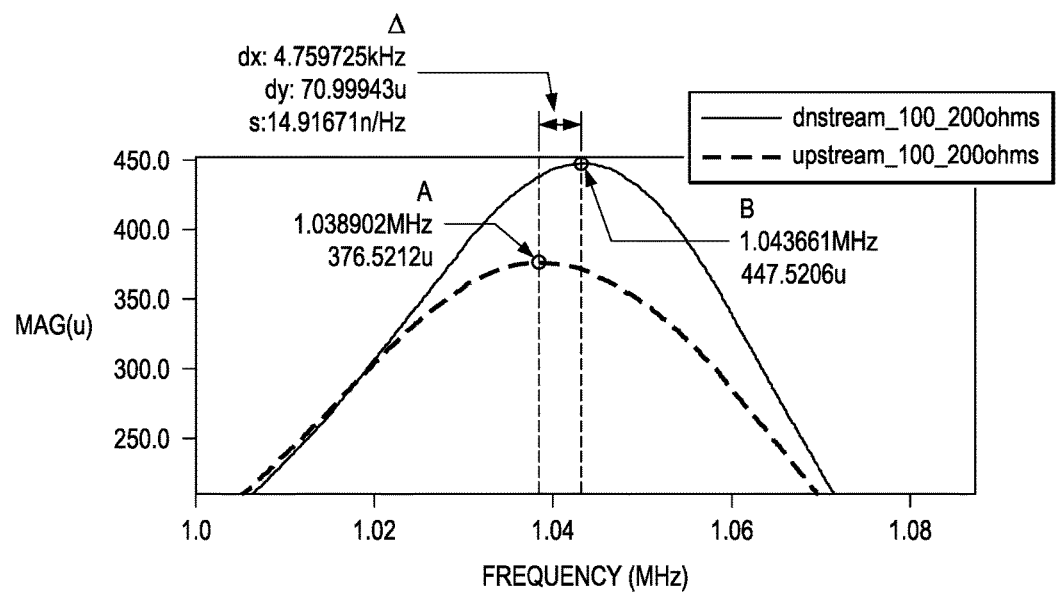
FIG. 8 depicts the difference in center frequencies between an FFT of the upstream signal and an FFT of the downstream signal when the electrical impedances of the transducer circuits are mismatched according to an embodiment of the disclosure.
Figure 9:
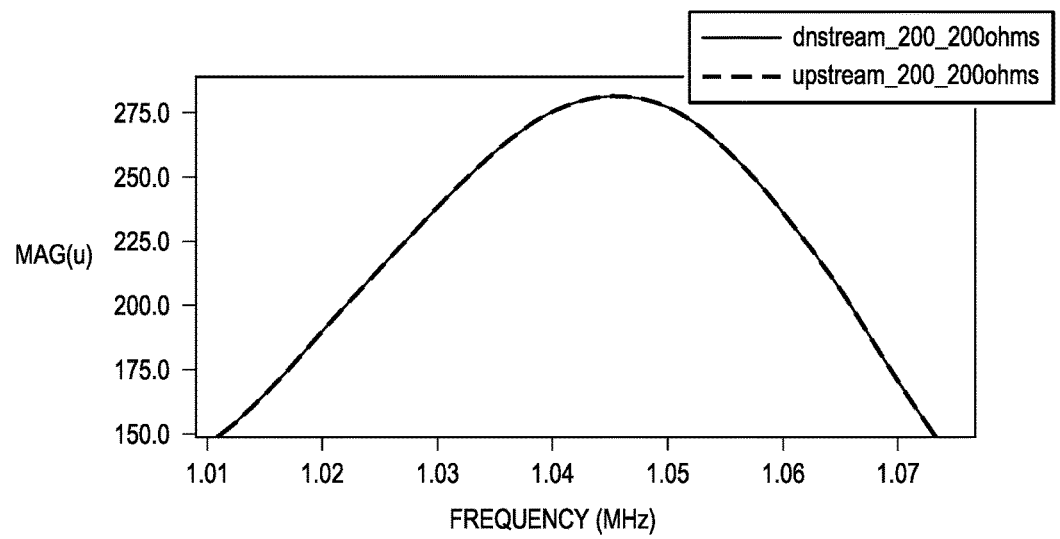
FIG. 9 depicts matching center frequencies for an FFT of the upstream signal and an FFT of the downstream signal when the electrical impedances of the transducer circuits are matched according to an embodiment of the disclosure.

FIGS. 8 and 9 demonstrate the second technique for measuring the difference between the two signals, i.e., comparing the frequency. It is known that when an FFT is applied to a sine wave to graph the sine wave into the frequency domain, the sine wave is transformed to a single line at the appropriate frequency. Using the same FFT, growing and decaying signals, such as the transmitted signals used in ultrasonic flow detection, will be represented in the frequency domain by more of a bell curve, such as the curves seen in FIGS. 8 and 9. In both of these figures, the x axis is the frequency and the y axis is the amplitude. FIG. 8 is a plot of the FFT of both the upstream signal and the downstream signal for the mismatched transducer circuits of FIG. 6. The offset of the center frequencies of the two signals, which is an indicator of their mismatch, is clearly visible in this figure. In contrast, the signals shown in FIG. 9 correspond to the matched transducers of FIG. 7. It can be seen that the center frequencies in the FFTs of the upstream signal and the downstream signal are closely matched in this graph; indeed the FFTs match point for point.

Thus far, it has been demonstrated that a mismatch can be detected between a pair of transducers by comparing the maximum amplitudes of the two signals and also by comparing the center frequencies of the FFTs of the signals. What remains is a method of determining a correction that can be applied to bring the transducers back into matching. FIGS. 10A and 10B show two-port equivalent representations of a flow meter operable to transmit and receive in both an upstream and a downstream direction; these figures also point out the impedance values that must match in each direction. In FIG. 10A, a signal is being transmitted upstream from transducer T1 to transducer T2, with T1 the signal generator and T2 the termination point. To adjust the upstream signal, transmitter driver impedance $Z_S$ 503 is matched to receiver load impedance $Z_L$ 505. Similarly, in FIG. 10B, a signal is being transmitted downstream from T2 to T1, with T2 the signal generator and T1 the termination point. To adjust the downstream signal, transmitter driver impedance $Z_S$ 509 is matched to receiver load impedance $Z_L$ 507. Once a determination is made that a correction is necessary, the correction can be applied to either the driver side circuitry or to the receiver side circuitry. That is, one side can remain fixed, while the other side is varied, as explained more fully below, to determine matching settings.

Figure 11B:
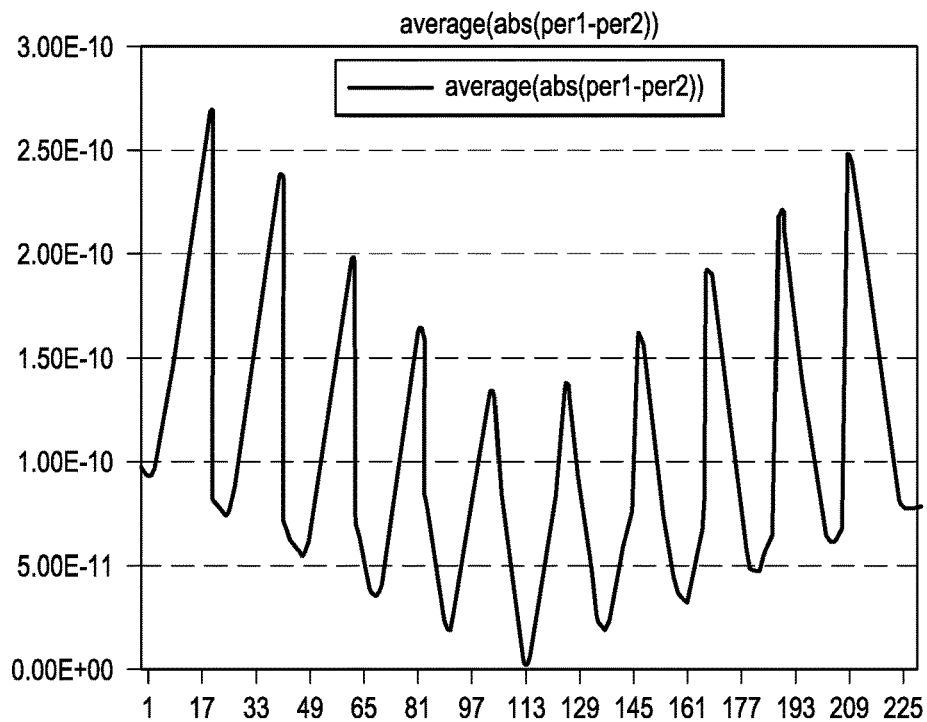
FIGS. 11B-D are graphs of each of the calculations from FIG. 11A.

Applicants modelled a pair of upstream/downstream transducers having a mismatch of 2.5% using Spice and a method for automatically tuning the driver/receiver impedances of the transducer pair was tested. In this method, the appropriate impedance (e.g., the driver impedance—transmit side) was held constant while both the resistive and the capacitive contributions to the corresponding impedance (e.g., the load impedance—receive side) are varied in a stepwise manner across respective ranges. Since the ideal values of the resistive and capacitive contributions are known, the respective ranges are selected as being on both sides of the ideal values. In the disclosed test, the resistive component was varied from a value of 195-205 Ohms in steps of 1 Ohm; the capacitive component was varied from a value of 80 pF to 120 pF in steps of 2 pF. In order to provide for orderly testing, the resistance was first held constant while the range of capacitance values were tested, then the resistance was changed by one step and the process repeated until all values had been tested. At each setting, both an upstream and a downstream signal were sent, data was captured, and a number of calculations were made on the signals. A portion of the results are illustrated in the table of FIG. 11A, specifically the portion closest to the final match. The first calculation we shall discuss is the average of the absolute difference between the periods of the upstream and downstream signals as they grow and decay, i.e. average(abs(per1−per2)). It is noted that the period of a signal is the inverse of the frequency, so that this calculation provides a value that indicates the difference in the center frequencies of the two signals. FIG. 11B provides a graph of this calculation, with the data points shown on the x axis and the magnitude of the difference on the y axis. It can be seen that in this illustration, the difference first starts low, rises until the value reaches a peak and starts to decline. As the various resistance/capacitance values are moved through, the dips in the magnitude drop lower until the value reaches a global minimum near the midpoint of this figure and starts to rise again. The global minimum indicates the setting that provides the best match.

Figure 11C:
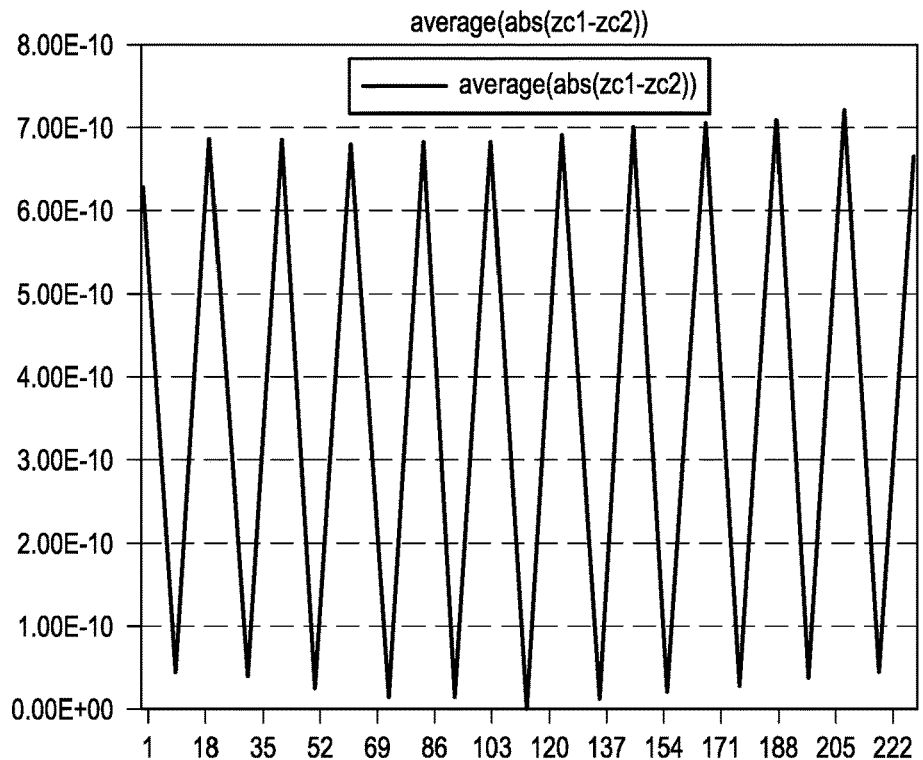
Figure 11D:
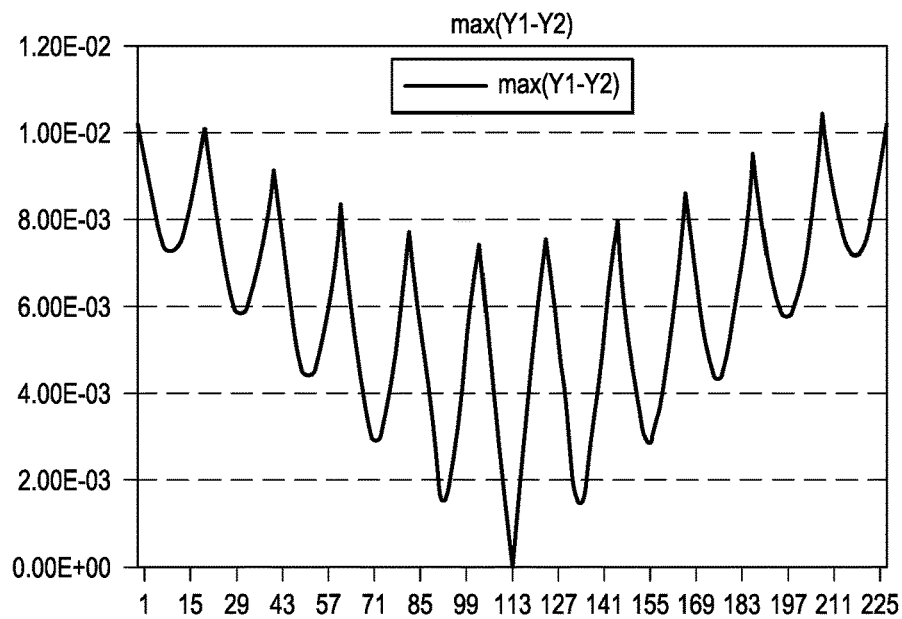

The second calculation averages the absolute difference in each zero crossing for the two signals, i.e., average(abs(zc1−zc2)). This is another method of measuring the difference in the phase of the two signals and thus how closely they match. A graph of this second calculation is shown in FIG. 11C. Both the first and second calculations can be used when the computing power is not available to calculate the FFT of the signals. The second calculation can also clearly indicate the best matching values. The third calculation shown is the difference in the maximum amplitude of the two signals, i.e., max(Y1−Y2); the associated graph is shown in FIG. 11D. Notably, both the calculation of FIG. 11B and the calculation of FIG. 11D can be used even when stopping the flow is not feasible or desirable. This last graph also exhibits a regularity that can be advantageous. As seen in this figure, each parabolic section represents one value of the resistance as the various capacitances are moved through.

In reviewing the data thus collected, Applicants have noted a shortcut that can be used to avoid running through the entire range of resistance and capacitance to determine the best values. When the resistive contribution to the impedance is held constant while the capacitive contribution is varied, the local minimum in the difference in amplitude calculation (i.e., max(Y1−Y2)) will identify the value of the capacitive contribution that will also provide the global minimum. Knowing this value means that the capacitive value can then be held at the value that provides a local minimum while the resistive value is varied to determine a value of the resistive contribution that provides the global minimum difference. The same idea holds true when the test starts by holding the capacitive contribution constant while the resistive contribution is varied. The local minimum in the difference in amplitude calculation will then also identify the global minimum value of the resistance to be used. This determined minimum resistance can then be held constant while the capacitive value is changed to discover the global minimum difference that indicates the components of the two transceivers are tuned.

Figure 12A:
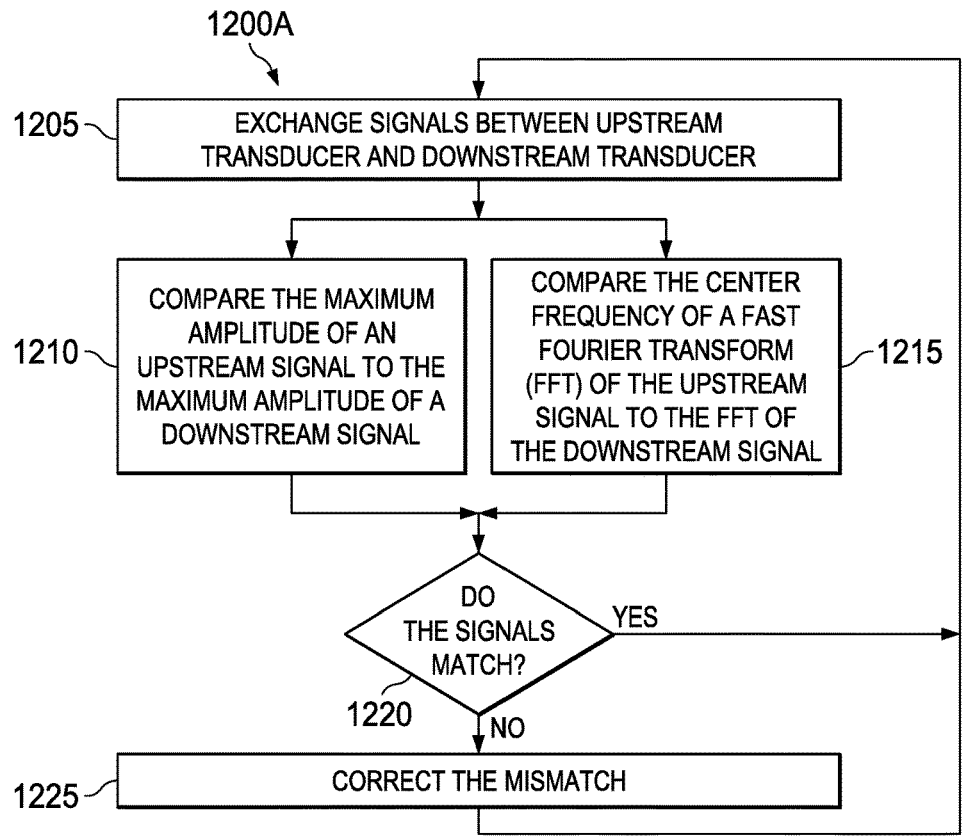
FIG. 12A is a flowchart for determining whether a pair of transducers match according to an embodiment of the disclosure.
Figure 12B:
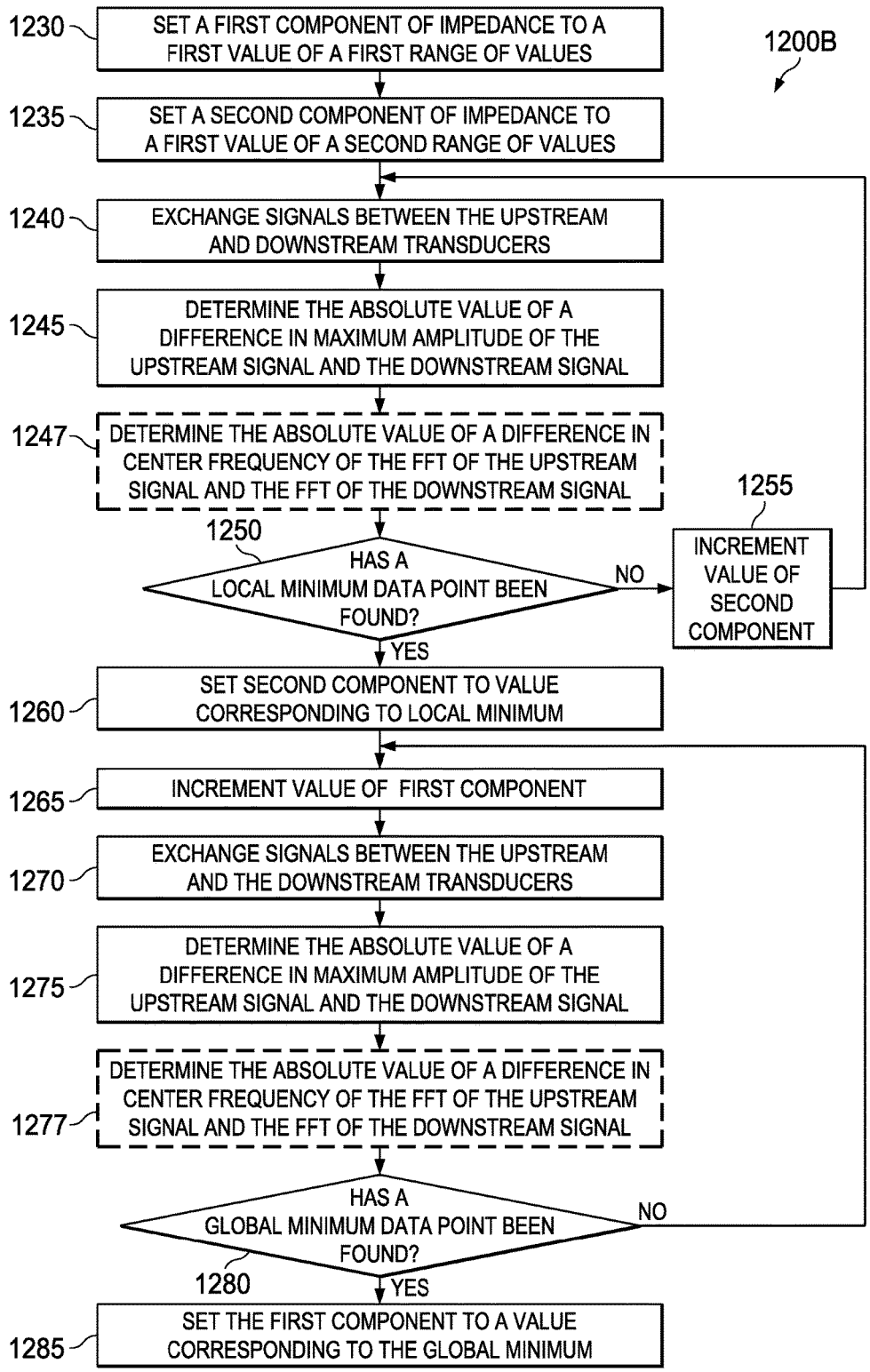
FIG. 12B is a flowchart for correcting a mismatch between a pair of transducers according to an embodiment of the disclosure.

Using this knowledge, a method of automatically tuning the driver/receiver circuitry of an upstream transducer and a downstream transducer to each other for reciprocal operation in an ultrasonic flowmeter is shown in FIGS. 12A-B. Flowchart 1200A illustrates the first part of this method, i.e., determining whether a pair of transducers matches each other. The method begins with exchanging (1205) signals between an upstream transducer and a downstream transducer. This exchange of signals is of course part of the normal operation of the ultrasonic flow meter. It will be understood that this operation includes sending a signal from the upstream transducer, which is received at the downstream transducer, and also includes sending a signal from the downstream transducer, which is received at the upstream transducer. These signals can be sent in any desired order. Once the signal data is received, the maximum amplitude of the upstream signal can be compared (1210) to the maximum amplitude of the downstream signal. The center frequency of an FFT of the upstream signal can also be compared (1215) to the center frequency of an FFT of the downstream signal. The two comparisons are shown as alternate paths that can be followed to emphasize that the method can be practiced using only one of these comparisons or can use a combination of the two paths. Likewise, these comparisons can be made in any order. The two comparisons are examined to determine (1220) whether the two signals match. If the two signals match, no correction is necessary and the method continues to monitor the exchanged signals and to watch for any changes. If the two signals do not match, the mismatch is corrected (1225). In at least one embodiment, this correction can be made by adjusting the results of the flow meter's measurements using the detected offset and available temperature information. In at least one embodiment, however, the impedance of the circuit associated with one of the transducers will be adjusted to correct the mismatch, as shown in the following figure.

The method of flow chart 1200B begins by setting (1230) a first component of the impedance to the first value in a first range of values and setting (1235) a second component of the impedance to the first value in a second range of values. As is discussed above, the two components of impedance that are adjusted according to an embodiment of the disclosure are resistance and capacitance. Either of these components can be used as the first component while the other component becomes the second. The ranges over which each component will be varied can be determined according to known parameters for these components and can be determined by one skilled in the art. The value of a data point corresponding to the current values of the first and second components is determined by exchanging (1240) signals between the upstream and downstream transducers and determining (1245) the absolute value of the difference in maximum amplitude of the upstream signal and the downstream signal. In at least one embodiment, the difference in center frequencies of an FFT on each signal is also determined (1247). The method determines (1250) whether a local minimum of the data points has been found. If not, the value of the second component is incremented (1255) to the next value in the range and the value of the corresponding data point is determined. It will be understood that finding the local minimum requires finding two or more data points. As long as the value of the data points is decreasing, i.e., the difference in the signals becomes less, it cannot be determined whether the local minimum has been reached. However, once the value of the data points starts increasing, the local minimum can be determined to be the data point having the lowest value. At this point, the second component is set (1260) to the value corresponding to the local minimum.

The method continues by incrementing (1265) the first component of impedance to a next value in the first range of values. The method exchanges (1270) signals between the upstream and downstream transducers and determines (1275) the absolute value of the difference in maximum amplitude of the upstream signal and the downstream signal. In at least one embodiment, the difference in center frequencies of an FFT on each signal is also determined (1277). A determination will be made (1280) whether a global minimum in the value of the data points has been located. As before, it will be understood that finding the global minimum requires finding two or more data points and that as long as the value of the data points is decreasing, it cannot be determined whether the global minimum has been reached. However, once the value of the data points starts increasing, the global minimum can be determined to be the data point having the lowest value. At this point, the first component is set (1285) to the value corresponding to the global minimum. This completes the method, as the two transducer circuits are now tuned to each other. The normal operation of the flow meter can continue at this point. Comparison of the signals can, of course, continue to operate and further corrections can be applied as necessary.

Although various embodiments have been shown and described in detail, the claims are not limited to any particular embodiment or example. Moreover, none of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method for performing auto-tuning in an ultrasonic flowmeter including a first circuit associated with a first transducer of the ultrasonic flowmeter and a second circuit associated with a second transducer of the ultrasonic flowmeter for reciprocal operation, the method comprising:

using a controller of the ultrasonic flowmeter to cause an upstream signal and a downstream signal to be exchanged between the between the first and second transducers, the upstream signal being transmitted from the first transducer to the second transducer and the downstream signal being transmitted from the second transducer to the first transducer;

using the controller to compare at least one of a group comprising respective maximum amplitudes of the upstream signal and the downstream signal and respective center frequencies of a Fast Fourier Transform (FFT) of the upstream signal and the downstream signal; and responsive to the controller determining, based on the comparison, that at least one of the group comprising the respective maximum amplitudes and the respective center frequencies do not match, using the controller to adjust an impedance value in at least one of the first circuit or the second circuit so that the center frequency of an FFT of the upstream signal and the center frequency of an FFT of the downstream signal substantially match after the adjustment.

2. The method of claim 1, wherein using the controller to adjust the impedance value comprises:

setting a first component of the impedance at a first value of a first range of values and a second component of the impedance at a first value of a second range of values;

determining a value of a respective data point by exchanging the upstream and downstream signals between the first transducer and the second transducer and determining an absolute value of a difference in maximum amplitude of the upstream signal and the downstream signal;
incrementing the second component to a next value in the second range and determining the value of the respective data point, wherein incrementing the second component and determining the respective data point is continued until a local minimum in the data points is determined;
setting the second component to a value corresponding to the local minimum;
incrementing the first component to a next value in the first range and determining the value of the respective data point, wherein incrementing the first component and determining the respective data point is continued until a global minimum in the data points is determined; and
setting the first component to a value corresponding to the global minimum.

3. The method as recited in claim 2, wherein:
the local minimum is determined when the second component has been set to all values in the second range or the value of the respective data point is no longer becoming smaller than a previous value; and
the global minimum is determined when the first component has been set to all values in the first range or the value of the respective data point is no longer becoming smaller than a previous value.

4. The method as recited in claim 3, wherein the first component is a resistance and the second component is a capacitance.

5. The method as recited in claim 2, wherein determining the value of the respective data point further comprises determining an absolute value of a difference in the center frequency of the FFT of the upstream signal and the center frequency of the FFT of the downstream signal.

6. The method as recited in claim 1, wherein, as a result of adjusting the impedance value of at least one of the first circuit or the second circuit so that the center frequency of an FFT of the upstream signal and the center frequency of an FFT of the downstream signal substantially match, an impedance value of the first circuit and an impedance value of the second circuit substantially match.

7. An integrated circuit (IC) device comprising:
a microcontroller that includes an interface configured to connect to a first transducer and a second transducer;
memory operably connected to the microcontroller and containing instructions that, when executed by the microcontroller, cause the microcontroller to:
control an exchange of an upstream signal and a downstream signal between the first and second transducers in which the upstream signal is transmitted by the first transducer and received by the second transducer and the downstream signal is transmitted by the second transducer and received by the first transducer;
compare at least one of a group comprising respective maximum amplitudes of the upstream signal and the downstream signal and respective center frequencies of a Fast Fourier Transform (FFT) of the upstream signal and the downstream signal; and
responsive to determining, based on the comparison, that at least one of the group comprising the respective maximum amplitudes and the respective center frequencies do not match, adjust an impedance value in at least one of a first circuit associated with the first transducer or a second circuit associated with the second transducer so that the center frequency of an FFT of the upstream signal and the center frequency of an FFT of the downstream signal substantially match after the adjustment.

8. The IC device of claim 7, wherein adjustment of the impedance value comprises using the microcontroller to:
set a first component of the impedance at a first value of a first range of values and a second component of the impedance at a first value of a second range of values;
determine a value of a respective data point by exchanging the upstream and downstream signals between the first transducer and the second transducer and determining an absolute value of a difference in maximum amplitude of the upstream signal and the downstream signal;
increment the second component to a next value in the second range and determine the value of the respective data point, wherein incrementing the second component and determining the respective data point is continued until a local minimum in the data points is determined;
set the second component to a value corresponding to the local minimum;
increment the first component to a next value in the first range and determine the value of the respective data point, wherein incrementing the first component and determining the respective data point is continued until a global minimum in the data points is determined; and
setting the first component to a value corresponding to the global minimum.

9. The IC device of claim 8, wherein:
the local minimum is determined when the second component has been set to all values in the second range or the value of the respective data point is no longer becoming smaller than a previous value; and
the global minimum is determined when the first component has been set to all values in the first range or the value of the respective data point is no longer becoming smaller than a previous value.

10. The IC device of claim 9, wherein the first component is a resistance and the second component is a capacitance.

11. The IC device of claim 8, wherein determining the value of the respective data point further comprises determining an absolute value of a difference in the center frequency of the FFT of the upstream signal and the center frequency of the FFT of the downstream signal.

12. A flow meter system comprising:
first and second transducers spaced apart from one another;
a first circuit associated with the first transducer;
a second circuit associated with the second transducer;
a microcontroller operably connected to the first and second transducers; and
memory operably connected to the microcontroller and containing instructions that, when executed by the microcontroller, cause the microcontroller to:
control an exchange of an upstream signal and a downstream signal between the first and second transducers in which the upstream signal is transmitted by the first transducer and received by the second transducer and the downstream signal is transmitted by the second transducer and received by the first transducer;

compare at least one of a group comprising respective maximum amplitudes of the upstream signal and the downstream signal and respective center frequencies of a Fast Fourier Transform (FFT) of the upstream signal and the downstream signal; and responsive to determining, based on the comparison, that at least one of the group comprising the respective maximum amplitudes and the respective center frequencies do not match, adjust an impedance value in at least one of the first circuit or the second circuit so that the center frequency of an FFT of the upstream signal and the center frequency of an FFT of the downstream signal substantially match after the adjustment.

13. The flow meter system of claim 12, wherein the first and second transducers are spaced apart from one another in a direction of a flow of a fluid through a flow path defined by an interior wall of a fluid conduit.

14. The flow meter system of claim 13, wherein the first and second transducers are configured to be coupled to an external wall of the fluid conduit.

15. The flow meter system of claim 12, wherein adjustment of the impedance value comprises using the microcontroller to:

set a first component of the impedance at a first value of a first range of values and a second component of the impedance at a first value of a second range of values;

determine a value of a respective data point by exchanging the upstream and downstream signals between the first transducer and the second transducer and determining an absolute value of a difference in maximum amplitude of the upstream signal and the downstream signal;

increment the second component to a next value in the second range and determine the value of the respective data point, wherein incrementing the second component and determining the respective data point is continued until a local minimum in the data points is determined;

set the second component to a value corresponding to the local minimum;

increment the first component to a next value in the first range and determine the value of the respective data point, wherein incrementing the first component and determining the respective data point is continued until a global minimum in the data points is determined; and setting the first component to a value corresponding to the global minimum.

16. The flow meter system of claim 15, wherein:

the local minimum is determined when the second component has been set to all values in the second range or the value of the respective data point is no longer becoming smaller than a previous value; and the global minimum is determined when the first component has been set to all values in the first range or the value of the respective data point is no longer becoming smaller than a previous value.

17. The flow meter system of claim 16, wherein the first component is a resistance and the second component is a capacitance.

18. The flow meter system of claim 15, wherein determining the value of the respective data point further comprises determining an absolute value of a difference in the center frequency of the FFT of the upstream signal and the center frequency of the FFT of the downstream signal.

19. The flow meter system of claim 12, wherein the upstream and downstream signals are ultrasonic signals.

* * * * *